United States Patent [19]

Polumbaum et al.

[11] Patent Number: 5,419,471

[45] Date of Patent: May 30, 1995

[54] COLLAPSIBLE STRUCTURE FOR MAINTAINING ARTICLES IN A STABILIZED CONDITION AND METHOD FOR MAKING SAME

[75] Inventors: Douglas H. Polumbaum, Roxbury, Conn.; Philip L. Fickling, Colorado Springs, Colo.; Rona Jaffe, New York, N.Y.

[73] Assignee: DHP Co., Roxbury, Conn.

[21] Appl. No.: 50,695

[22] Filed: Apr. 19, 1993

[51] Int. Cl.⁶ .................................................. B60R 7/00
[52] U.S. Cl. ................................ 224/42.42; 224/273; 206/174; 220/528; 220/529
[58] Field of Search .................... 224/273, 42.42; 206/174, 175; 229/120.14, 120.32, 120.38, 120.29; 220/528, 529, 530; 248/95, 97; 211/12, 85, 73, 195; 296/37.5

[56] References Cited

U.S. PATENT DOCUMENTS

| | | | |
|---|---|---|---|
| 1,072,185 | 9/1913 | Smiley | 229/117.05 X |
| 1,500,067 | 7/1924 | Frisk | 224/42.31 |
| 2,149,042 | 2/1939 | Branthover | 248/97 |
| 2,874,885 | 2/1959 | Young | 224/42.42 |
| 3,172,538 | 3/1965 | Fowler | 211/194 |
| 3,199,762 | 8/1965 | Coons | 229/117.05 |
| 3,986,656 | 11/1976 | November | 229/15 |
| 4,029,244 | 6/1977 | Roberts | 224/42.42 R |
| 4,069,993 | 1/1978 | Shanks | 248/97 |
| 4,192,443 | 3/1980 | McLaren | 229/120.14 |
| 4,226,348 | 6/1980 | Dottor | 224/42.42 |
| 4,267,996 | 5/1981 | Turcott | 248/97 |
| 4,273,167 | 6/1981 | Stillwell | 248/97 X |
| 4,376,520 | 3/1983 | Wetherington | 248/97 |
| 4,540,213 | 9/1985 | Herlitz et al. | 296/37.5 |
| 4,601,390 | 7/1986 | Rosenthal et al. | 206/175 |
| 4,746,041 | 5/1988 | Cook et al. | 224/42.42 |
| 4,782,943 | 11/1988 | Blackman | 206/175 |
| 4,951,867 | 8/1990 | McManus | 224/42.42 X |
| 5,167,363 | 12/1992 | Adkinson et al. | 229/120.29 X |

FOREIGN PATENT DOCUMENTS 1266616  6/1961  France .................... 206/174

Primary Examiner—Henry L. Recla
Assistant Examiner—David J. Walczak
Attorney, Agent, or Firm—Sprung Horn Kramer & Woods

[57] ABSTRACT

A collapsible structure for maintaining articles in a stabilized condition and a method of making same. The structure comprises an integral blank of bendable material having pre-cut lines formed therein, fold lines formed thereon. Portions of the blank are interconnected into a generally flat collapsed position, and it is bendable into an open position to define a plurality of article receiving receptacles.

15 Claims, 4 Drawing Sheets

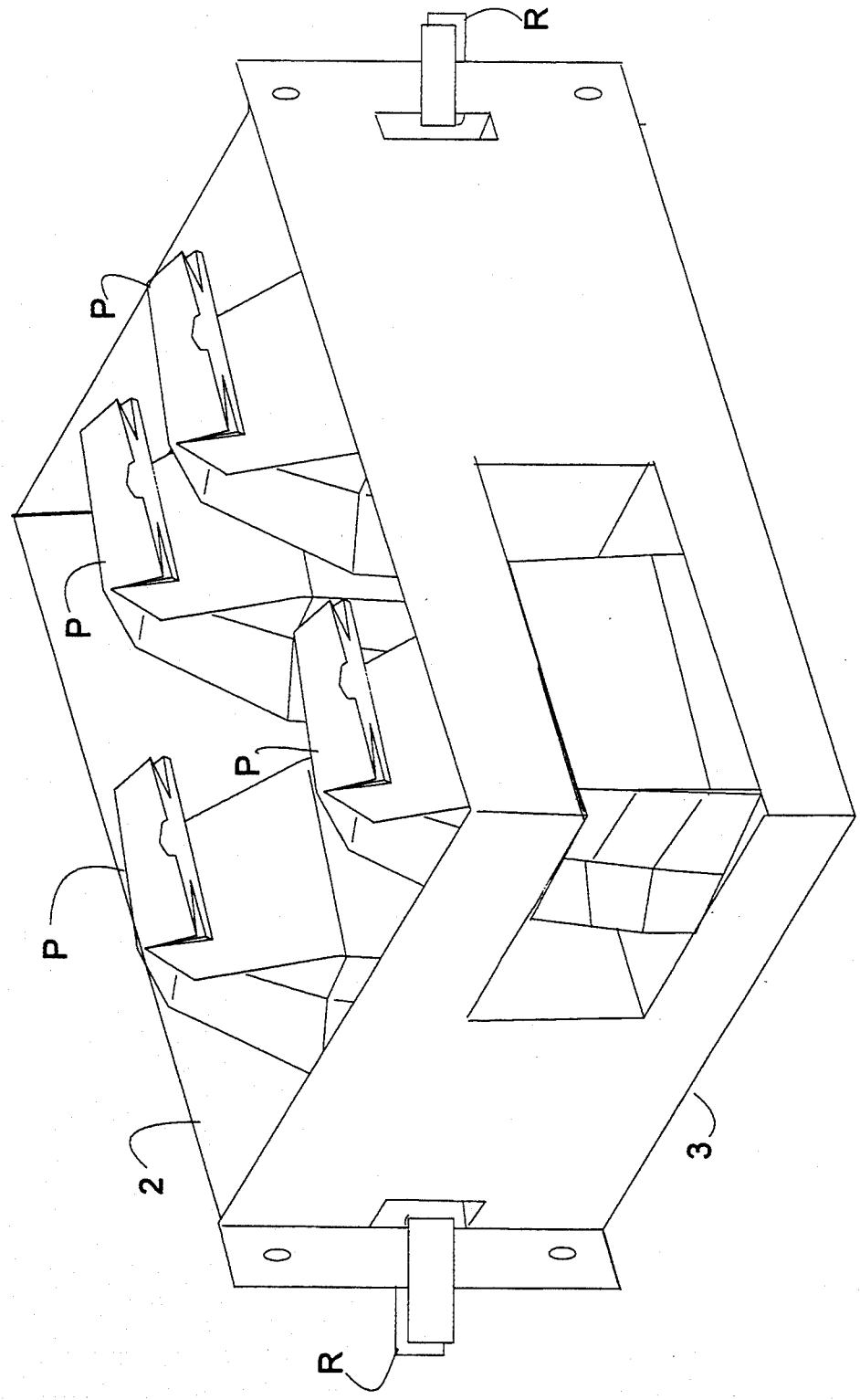

COLLAPSIBLE STRUCTURE FOR MAINTAINING ARTICLES IN A STABILIZED CONDITION AND METHOD FOR MAKING SAME

BACKGROUND OF THE INVENTION

The present invention relates to a collapsible structure for maintaining the stability of articles and the method of making such a structure.

At present, no provision is made in passenger vehicles for maintaining packages or containers in a stabilized condition during movement. Therefore, when the vehicle is suddenly started or stopped or it negotiates a tight curve, packages stored in either the passenger compartment or the trunk of the vehicle will move around, and the contents of the packages fall out. This is particularly true with grocery bags, which can either be in paper bags, which can stand up but have very little stability, or plastic bags, which can neither stand up on their own or maintain stability.

Package and container holding devices have been proposed in the art, but these have numerous disadvantages. For example, U.S. Pat. No. 4,029,244 discloses a collapsible structure, which is complex in its construction and takes up a considerable space in a vehicle even when it is collapsed. U.S. Pat. No. 3,986,656, while disclosing a device having a simpler structure, must be disassembled and reassembled after each use and when it is to be used again. Other structures of this type, which suffer from these and other disadvantages, are shown in U.S. Pat. Nos. 3,172,538; 4,376,520; 4,273,167; 4,267,996; 4,069,993; 4,540,213; 2,149,042; 4,226,348; 4,746,041; 1,500,067; and 2,874,885.

SUMMARY OF THE INVENTION

The main object of the present invention is to provide a collapsible structure for maintaining packages or containers in a stabilized condition, the structure being simple and which is easy to collapse and open for use without requiring any reassembly.

These and other features and advantages of the present invention are achieved in accordance with the present invention by a collapsible structure comprising an integral blank of bendable material having means forming pre-cut lines therein, means forming fold lines thereon and means interconnecting portions of the blank into a generally flat collapsed position which is bendable into an open position to define a plurality of article receiving receptacles or compartments.

In accordance with the invention, the integral blank can be composed of corrugated plastic or corrugated paper board. The corrugated plastic is preferably from 1/16th to ⅛th of an inch thick. When the portions of the integral blank are interconnected into the generally flat collapsed position, it has a preferable size of 12"×46" and thus can fit in the trunk of virtually any car for storage purposes.

In one embodiment of the present invention, the integral blank is folded in half along a central fold line. In an alternative embodiment the integral blank is cut in half and the two halves are connected with the edges along the central cut line being aligned with each other.

The two halves are connected by means of at least one of adhesive and plastic screws. The adhesive can be a cement or double-sided tape. Other connecting means can be alternatively used.

The blank also preferably has cutouts which act as handles for carrying and for mounting the structure when it is in the open position into a trunk or passenger compartment.

Another feature of the present invention is a method of producing a collapsible structure. In accordance with the present invention, this method comprises providing an integral blank of bendable material, forming cut lines therein, forming fold lines thereon, and interconnecting portions of the blank into a generally flat collapsed position which is bendable along the fold lines into an open position which preferably define a plurality of article receiving receptacles.

In one embodiment of the method, the portions of the blank are interconnected by first cutting the blank in half and joining the halves by means of plastic screws, adhesives or combination thereof. In an alternative embodiment, the blank is folded around a central fold line and the halves are joined together by means of plastic screws, adhesives or combinations of the two. The integral blank and the cut lines are formed by die cutting. The fold lines can be formed by scoring and forming an indentation.

These and other features and advantages of the present invention will be discussed in more detail with respect to the following detailed description of the invention taken with the attached drawings, wherein:

BRIEF DESCRIPTION OF THE DRAWINGS

FIG. 4 is a perspective view of the structure is use.

DETAILED DESCRIPTION OF THE INVENTION

Figure 1:
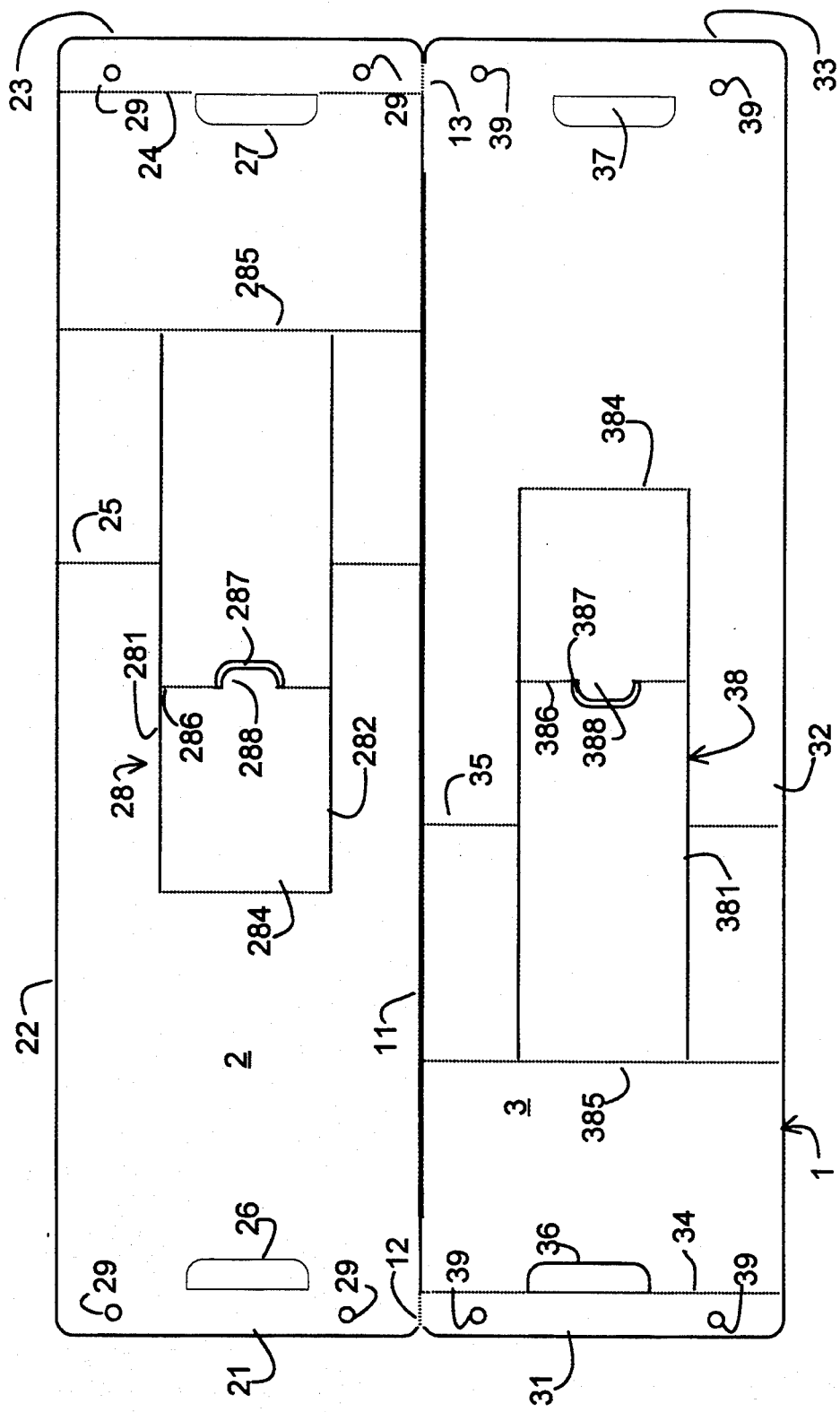
FIG. 1 is a top view of a blank in accordance with the present invention.

Referring now to FIG. 1, an integral blank 1 is shown which is cut from bendable material along edges 21, 22, 23, 31, 32, 33. The integral blank, in the embodiment shown in FIG. 1, is formed with a plurality of cut lines shown as solid lines in FIG. 1 and a plurality of bending lines shown as dotted lines in FIG. 1.

At a central longitudinal axis of the integral blank 1 is a fold line 12, 13 which has an intermediate cut line 11 therealong. This central fold line and cut line combination 11–13 defines two halves 2, 3 which are mirror images of each other. The halves include fold lines 24, 34 and 25, 35 and cut lines 26, 27 and 36, 37, which define cutouts which are used as handles for carrying and for mounting as will be described hereinafter. The halves also optionally include cutouts 29, 39, which are used as mounting holes for plastic screws which are described hereinafter.

The halves 2, 3 also include interior sections 28, 38, which are formed by a plurality of fold lines 284–286 and 384–386 and cut lines 281, 282, 287 and 381, 382 and 387. These cut lines form cut out sections and tabs 288, 388, whose function will be described later.

The integral blank as shown in FIG. 1 is simply assembled into a collapsible structure for maintaining packages in a stabilized condition, as follows. In the embodiment shown in FIG. 1, the half 2 is folded downwardly along fold lines 12, 13 so as to be superposed on the rear face of half 3. The entire assembly thereafter includes the joining of portions of the two halves together, as will be described. Specifically, the two end portions of halves 2 and 3 are connected together and the tabs 288 and 388 are inserted into cut out portions or optionally connected to interior sections 38 and 28 respectively. The connection of these two portions are clearly shown in FIG. 3.

Figure 2:
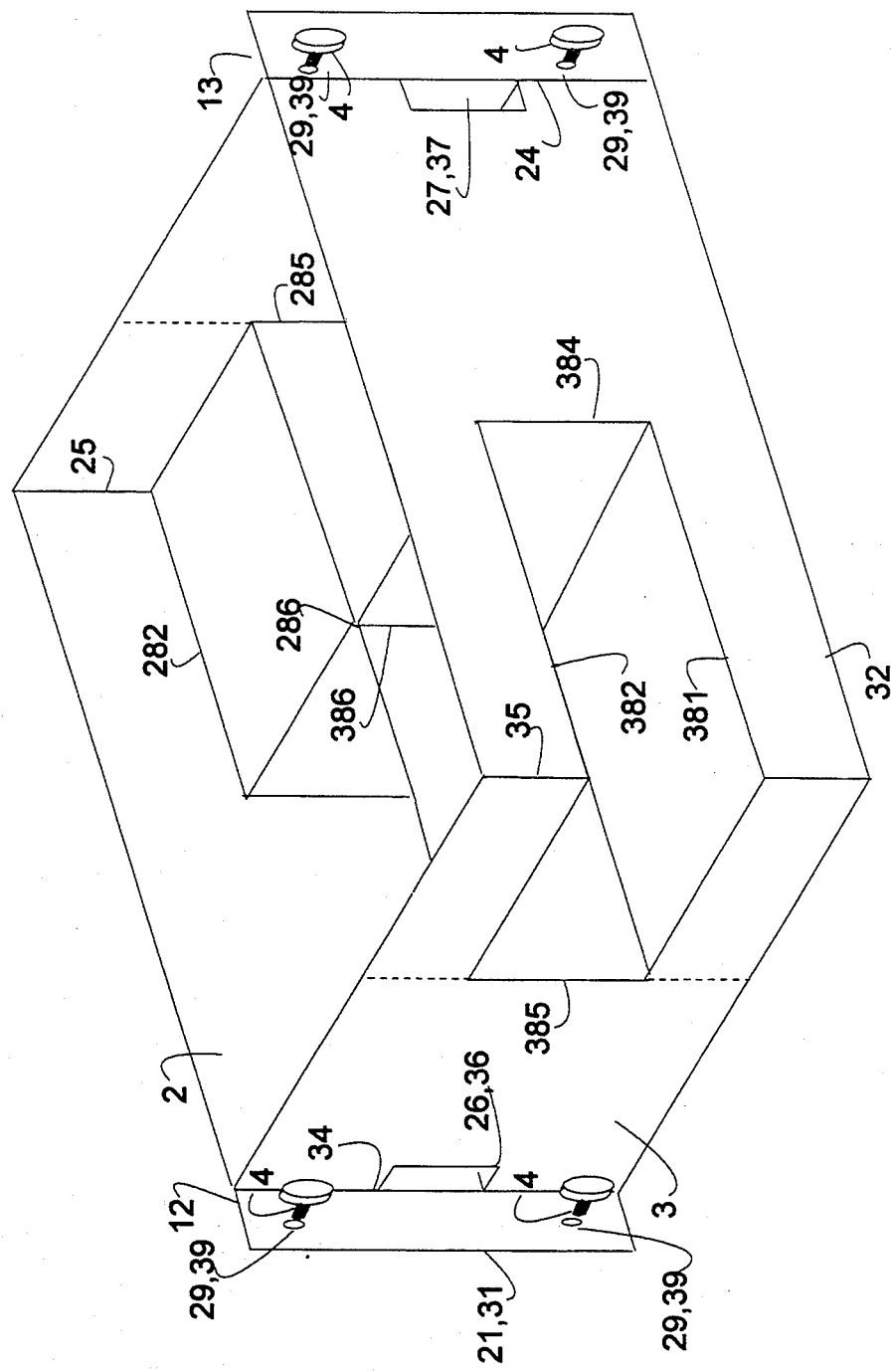
FIG. 2 is a perspective view of the interconnected halves bent into the open position.

The end portions of halves 2 and 3 are connected together in FIG. 2 by means of plastic screws 4, which are threadably received in the cutouts formed by cut lines 29 and 39. Tabs 288 and 388 are joined to interior sections 38 and 28 respectively by adhesive.

Figure 3:
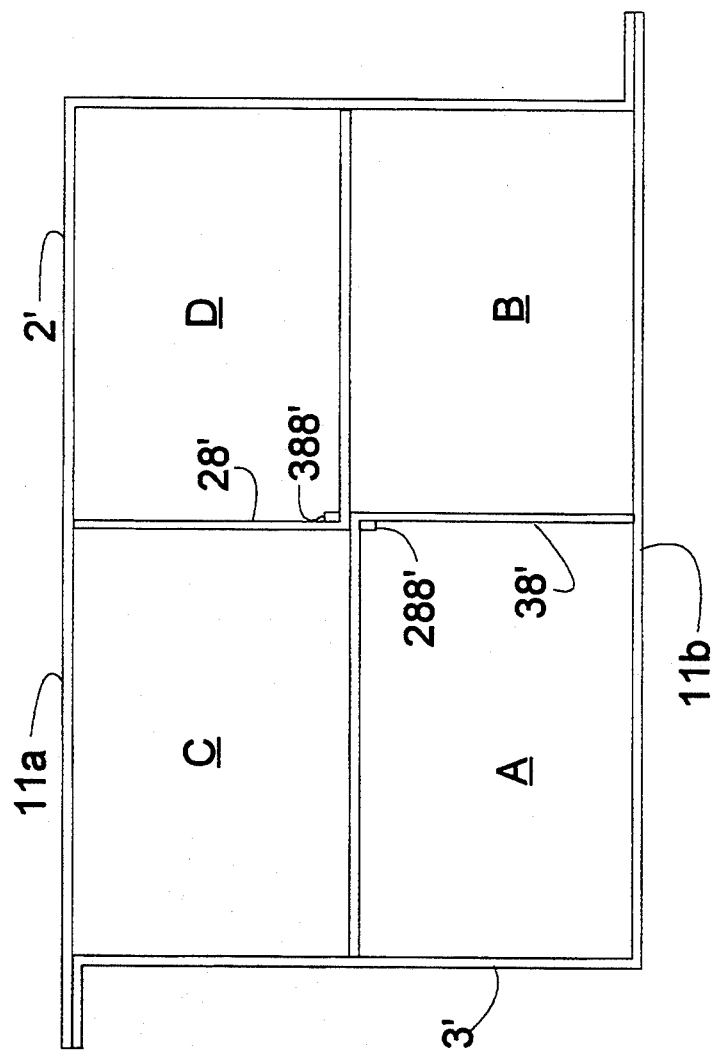
FIG. 3 is a top view of an alternative embodiment of the structure shown in FIG. 2.

In the embodiment shown in FIG. 3, halves 2' and 3' are joined at the end portions by adhesive and tabs 288' 388' are inserted into interior sections 38' and 28' respectively and stay in place without the need for adhesive.

In the alternative embodiment shown in FIG. 3, instead of utilizing fold lines 12 and 13, a cut line extends all the way between edges 23, 33 on the one hand and 21, 31 on the other. As shown in FIG. 3, the cut line produces two edges 11a and 11b on halves 2' and 3' respectively and these two edges are aligned so that the end portions can be connected together as is the case of the embodiment shown in FIG. 2.

The collapsed structure formed by joining the two halves 2 and 3 together as described above, can be bent into an open position by outfolding halves 2 and 3 along bending lines 24, 25 and 34, 35 and infolding interior sections 28 and 38 along bending lines 284–286 and 384–386.

The result is the structure shown in FIG. 2 and FIG. 3. The structure can be collapsed by merely infolding the halves 2, 3 and outfolding the interior sections 28, 38 to the generally flat collapsed position. Thus, no assembly or reassembly is needed each time the structure is to be used.

The interior sections in conjunction with the inner faces halves 2, 3 form a plurality of article receiving receptacles A, B, C and D into which packages, soda bottles, wine bottles, coffee cups and the like can be placed, as shown in FIG. 4, to maintain the stability thereof during movement of a vehicle.

The cutout portions formed by cut lines 26, 27, 36 and 37 are also used to loop a string or rope or strap R therethrough to secure the structure in position in the trunk of a car or in a passenger compartment to prevent its movement when the vehicle is moving.

It is envisioned that the structure can also be used as an insert to impart additional rigidity and as a separating device to prevent glass bottles and the like from breaking due to impact with each other.

It is understood that the present invention is not limited to the particular embodiments illustrated and described hereinabove, but that various changes and modifications may be made without departing from the spirit and scope of the invention as defined in the claims.

What is claimed is:

1. A collapsible structure for maintaining articles in a stabilized condition, comprising: an integral blank of bendable material having means forming pre-cut lines therein, means forming fold lines thereon and means interconnecting portions of the blank into a generally flat collapsed position and bendable into an open position to define a plurality of article receiving receptacles, wherein the integral blank has a central fold line at a longitudinal axis thereof with an intermediate cut line to define first and second halves, wherein the first and second halves have fold lines perpendicular to the central fold line and pre-cut lines parallel to the central fold line forming interior sections, wherein the interconnecting means comprises means connecting the first and second halves folded onto each other around the central fold line at end portions thereof and at the interior sections and wherein the interconnected halves are bent from the collapsed position to open position by outfolding the halves and infolding the interior sections and wherein the infolded interior sections demarcate the article receiving receptacles in conjunction with the halves.

2. The structure according to claim 1, wherein the integral blank is composed of corrugated plastic or corrugated paperboard.

3. The structure according to claim 1, wherein the integral blank has means forming cutout portions for mounting the structure when in the open position.

4. The structure according to claim 1, wherein the connecting means comprises adhesive.

5. A collapsible structure for maintaining articles in a stabilized condition, comprising: an integral blank of bendable material having means forming pre-cut lines therein, means forming fold lines thereon and means interconnecting portions of the blank into a generally flat collapsed position and bendable into an open position to define a plurality of article receiving receptacles, wherein the integral blank has a central fold line at a longitudinal axis thereof with an intermediate cut line to define first and second halves, wherein the first and second halves have fold lines perpendicular to the central fold line and pre-cut lines parallel to the central fold line forming interior sections, wherein the interconnecting means comprises means connecting the first and second halves folded onto each other around the central fold line at end portions thereof and at the interior sections and wherein the connecting means comprises plastic screws.

6. A collapsible structure for maintaining articles in a stabilized condition, comprising: an integral blank of bendable material having means forming pre-cut lines therein, means forming fold lines thereon and means interconnecting portions of the blank into a generally flat collapsed position and bendable into an open position to define a plurality of article receiving receptacles, wherein the integral blank has a central cut line at a longitudinal axis thereof to define first and second halves, wherein the first and second halves have fold lines perpendicular to the central line and pre-cut lines parallel to the central cut line forming interior sections, wherein the interconnecting means comprises means connecting the first and second halves cut line at end portions thereof and at the interior sections and wherein the interconnected halves are bent from the collapsed position to open position by outfolding the halves and infolding the interior sections and wherein the infolded interior sections demarcate the article receiving receptacles in conjunction with the halves.

7. The structure according to claim 6, wherein the connecting means comprises adhesive.

8. A collapsible structure for maintaining articles in a stabilized condition, comprising: an integral blank of bendable material having means forming pre-cut lines therein, means forming fold lines thereon and means interconnecting portions of the blank into a generally flat collapsed position and bendable into an open position to define a plurality of article receiving receptacles, wherein the integral blank has a central cut line at a longitudinal axis thereof to define first and second halves, wherein the first and second halves have fold lines perpendicular to the central line and pre-cut lines parallel to the central cut line forming interior sections, wherein the interconnecting means comprises means connecting the first and second halves cut line at end portions thereof and at the interior sections and wherein the connecting means comprises plastic screws.

9. A method of producing a collapsible structure, comprising the steps of:

providing an integral blank of bendable material;

forming cut lines therein;

forming fold lines therein; and interconnecting portions of the blank into a generally flat collapsed position and bendable along the fold lines into an open position to define a plurality of receptacles; and wherein the step of interconnecting comprises forming a central fold line on the integral blank along a longitudinal axis with an intermediate cut line to define first and second halves, wherein the first and second halves have fold lines perpendicular to the central fold line and cut lines parallel to the central fold line to form interior sections, folding the first and second halves around the central fold line, and connecting the first and second halves at end portions thereof and at the interior sections and wherein the interconnected portions are bendable into the open position by outfolding the halves and infolding the interior sections which demarcate the receptacles in conjunction with inner faces of the halves.

10. The method according to claim 9, further comprising forming cut-outs for mounting the structure when in the open position.

11. The method according to claim 9, wherein the step of connecting comprises applying an adhesive to the interior sections of the first and second halves.

12. A method of producing a collapsible structure, comprising the steps of:

providing an integral blank of bendable material;

forming cut lines therein;

forming fold lines therein; and interconnecting portions of the blank into a generally flat collapsed position and bendable along the fold lines into an open position to define a plurality of receptacles; and wherein the step of interconnecting comprises forming a central fold line on the integral blank along a longitudinal axis with an intermediate cut line to define first and second halves, wherein the first and second halves have fold lines perpendicular to the central fold line and cut lines parallel to the central fold line to form interior sections, folding the first and second halves around the central fold line, and connecting the first and second halves at end portions thereof and at the interior sections and wherein the step of connecting comprises inserting a plastic screw into the end portions of the first and second halves.

13. A method of producing a collapsible structure, comprising the steps of:

providing an integral blank of bendable material;

forming cut lines therein;

forming fold lines therein; and interconnecting portions of the blank into a generally flat collapsed position and bendable along the fold lines into an open position to define a plurality of receptacles; and wherein the step of interconnecting comprises forming a central cut line on the integral blank along a longitudinal axis to define first and second halves, wherein the first and second have fold lines perpendicular to the central cut line and cut lines parallel to the central cut line to form interior sections, aligning the first and second halves along the central cut line, and connecting the first and second halves at end portions thereof and at the interior sections and wherein the interconnected portions are bendable into the open position by outfolding the halves and infolding the interior sections which demarcate the receptacles in conjunction with inner faces of the halves.

14. The method according to claim 13, wherein the step of connecting comprises applying an adhesive to the interior sections of the first and second halves.

15. A method of producing a collapsible structure, comprising the steps of:

providing an integral blank of bendable material;

forming cut lines therein;

forming fold lines therein; and interconnecting portions of the blank into a generally flat collapsed position and bendable along the fold lines into an open position to define a plurality of receptacles; and wherein the step of interconnecting comprises forming a central cut line on the integral blank along a longitudinal axis to define first and second halves, wherein the first and second have fold lines perpendicular to the central cut line and cut lines parallel to the central cut line to form interior sections, aligning the first and second halves along the central cut line, and connecting the first and second halves at end portions thereof and at the interior sections and wherein the step of connecting comprises inserting a plastic screw into the end portions of the first and second halves.

* * * * *